United States Patent
Kingsbury et al.

(10) Patent No.: US 6,505,286 B1
(45) Date of Patent: *Jan. 7, 2003

(54) USER SPECIFIABLE ALLOCATION OF MEMORY FOR PROCESSES IN A MULTIPROCESSOR COMPUTER HAVING A NON-UNIFORM MEMORY ARCHITECTURE

(75) Inventors: Brent A. Kingsbury, Beaverton, OR (US); Corene Casper, Beaverton, OR (US); Phillip E. Krueger, Lake Oswego, OR (US); Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/668,948

(22) Filed: Sep. 22, 2000

Related U.S. Application Data (62) Division of application No. 08/920,672, filed on Aug. 29, 1997, now Pat. No. 6,205,528.

(51) Int. Cl.[7] .............................................. G06F 12/02
(52) U.S. Cl. ....................... 711/170; 711/153; 711/171; 711/172; 711/173
(58) Field of Search ........................ 711/170–173, 153, 711/147, 148

(56) References Cited

U.S. PATENT DOCUMENTS

| | | | |
|---|---|---|---|
| 4,918,586 A | 4/1990 | Niimura et al. ............ 711/102 |
| 5,109,336 A | 4/1992 | Guenther et al. ........... 711/170 |
| 5,193,202 A | 3/1993 | Jackson et al. ................ 711/6 |
| 5,237,673 A | 8/1993 | Orbits et al. ................ 711/170 |
| 5,784,697 A | 7/1998 | Funk et al. .................. 711/170 |
| 5,784,699 A | * 7/1998 | McMahon et al. .......... 711/171 |
| 5,920,881 A | 7/1999 | Porterfield ..................... 711/2 |

\* cited by examiner

*Primary Examiner*—Than Nguyen
(74) *Attorney, Agent, or Firm*—Pryor A. Garnett; Law Offices of Michael Dryja (57) ABSTRACT

A method for a user process to specify a policy for allocating pages of physical memory on the nodes of a multinode multiprocessor computer system. Through means such as a system call, an application program can specify to the operating system that physical pages of memory for an application-specified portion of virtual address space are to be physically allocated upon a specified set of nodes, subject to the additional selection criteria that the pages are to be allocated at first reference upon: 1) the node upon which the reference first occurs; 2) the node which has the most free memory, or 3) that the pages should be evenly distributed across the indicated set of nodes. In effect, the operating system remembers the specified allocation policy and node set from which the physical pages can be subsequently allocated as established by a system call. Subsequent use of the virtual address space for which the allocation policy is defined results in the memory being allocated accordingly. In this way, an application program can use memory with the memory-locality most advantageous to it. The preferred embodiments of the invention include extensions to the mmap and shmget functions of UNIX-based operating systems.

20 Claims, 6 Drawing Sheets

USER SPECIFIABLE ALLOCATION OF MEMORY FOR PROCESSES IN A MULTIPROCESSOR COMPUTER HAVING A NON-UNIFORM MEMORY ARCHITECTURE

CROSS-REFERENCE TO RELATED APPLICATION(S)

This is a divisional application of U.S. patent application Ser. No. 08/920,672, filed on Aug. 29, 1997, now U.S. Pat. No. 6,205,528.

FIELD OF THE INVENTION

This invention relates generally to multiprocessor computer systems having shared memory distributed among a multiple of nodes. More specifically, this invention relates to the physical placement of memory among the nodes of a multinode computer system, when allocated in response to processor faults. By controlling the physical placement of the memory so allocated among the nodes of the system, references local to each node than would otherwise by the case using a naive or other physical memory placement policy. The increased memory locality in turn yields a commensurate improvement in the overall performance of the system.

BACKGROUND OF THE INVENTION

Multiprocessor computers by definition contain multiple processors that can execute multiple parts of a computer program and/or multiple distinct programs simultaneously, in a manner known as parallel computing. In general, multiprocessor computers execute multithreaded-programs and/or single-threaded programs faster than conventional single processor computers, such as personal computers (PCs), that must execute programs sequentially. The actual performance advantage is a function of a number of factors, including the degree to which parts of a multithreaded-program and/or multiple distinct programs can be executed in parallel and the architecture of the particular multiprocessor computer at hand.

Multiprocessor computers may be classified by how they share information among the processors. Shared-memory multiprocessor computers offer a common physical memory address space that all processors can access. Multiple processes and/or multiple threads within the same process can communicate through shared variables in memory that allow them to read or write to the same memory location in the computer. Message passing multiprocessor computers, in contrast, have a separate memory space for each processor, requiring processes in such a system to communicate through explicit messages to each other.

Shared-memory multiprocessor computers may further be classified by how the memory is physically organized. In distributed shared-memory computers, the memory is divided into modules physically placed near each processor. Although all of the memory modules are globally accessible, a processor can access memory placed nearby faster than memory placed remotely. Because the memory access time differs based on memory location, distributed shared memory systems are often called non-uniform memory access (NUMA) machines. By contrast, in centralized shard-memory computers, the memory is physically in one location. Centralized shared-memory computers are called uniform memory access (UMA) machines because the memory is equidistant in time from each of the processors. Both forms of memory organization typically use high-speed cache memory in conjunction with main memory to reduce execution time.

Multiprocessor computers with distributed shared memory are often organized into multiple nodes with one or more processors per node. The nodes interface with each other through a memory-interconnect network by using a protocol, such as the protocol described in the Scalable Coherent Interface (SCI)(IEEE 1596). UMA machines typically use a bus for interconnecting all of the processors.

further information on multiprocessor computer systems in general and NUMA machines in particular can be found in a number of works including *Computer architecture: A Quantitative Approach* ($2^{nd}$ Ed. 1996), by D. Patterson and J. Hennessy, which is hereby incorporated by reference.

While NUMA machines offer significant advantages over UMA machines in terms of bandwidth, they face the prospect of increased delay in some instances if their operating systems do not take into account the physical division of memory. For example, in responding to a system call by a process (a part of a computer program in execution) for allocating physical memory, conventional operating systems do not consider the node location of the process, the amount of free memory on each node, or a possible preference by the process for memory on a specific node in responding to the request. The operating system simply allocates memory for the shared memory object from its global free list of memory. This can result in the process making multiple accesses to remote nodes if the memory is not allocated on the process's node. Or it can result in continual process faults such as page faults and movement of processes into and out of memory ("swapping") if the memory is allocated on a node that has little free memory.

An objective of the invention, therefore, is to provide a method for allocating memory in a multinode multiprocessor system which responds to the communicated physical placement needs of the application program requesting the memory. The program is created by a user such as a computer programmer, and it is believed that the user in many situations knows best how the program should run in the system, and where the physical memory used by the program should be placed.

SUMMARY OF THE INVENTION

A method according to the invention enables an application program (i.e., a user process) to specify a policy for allocating physical memory on a node of a multinode multiprocessor computer system for the program. The memory is then dynamically allocated, when needed, in accordance with the specified policy.

According to the invention, the computer operating system receives a request from an application program to create, or reserve, a portion of virtual address space and to allocate, in accordance with a policy specified by the program, physical memory on a node as a result of a subsequent reference to the virtual address space portion. In response to the request, the operating system crates the virtual address space portion. In response to a subsequent reference to the virtual address space portion by an application program, the physical memory is allocated on a node in accordance with the specified policy for association with the virtual address space portion. The set of nodes on which memory must be allocated in accordance with the policy may also be specified. Alternatively, the physical memory can be allocated at the time the operating system responds to the request.

Related to the method is a data structure for controlling the allocation of memory in accordance with an allocation policy specified by the application program.

In a preferred embodiment of the invention, an application program can specify through means such as a system call to the operating system that physical pages of memory for an application-specified portion of virtual address space are to be physically allocated upon a specified set of nodes within the multinode computer system. This allocation is subject to the additional selection criteria that the pages are to be allocated at first reference upon: 1) the node upon which the reference first occurs; 2) the node which has the most free memory, or 3) that the pages should be evenly distributed across the indicated set of nodes. In effect, the operating system remembers the specified allocation policy and node set from which the physical pages can be subsequently allocated, as established by the system call. Subsequent use of the virtual address space for which the allocation policy is defined results in the memory being allocated accordingly. In this way, an application program can use memory with the memory-locality most advantageous to it. Of course, other selection criteria than the above three may be used.

The preferred embodiments of the invention include extensions to the mmap and shmget functions of UNIX-based operating systems.

The foregoing and other objects, features, and advantages of the invention will become more apparent from the following detailed description of a preferred embodiment which proceeds with reference to the accompanying drawings.

DETAILED DESCRIPTION OF A PREFERRED EMBODIMENT

Figure 1:
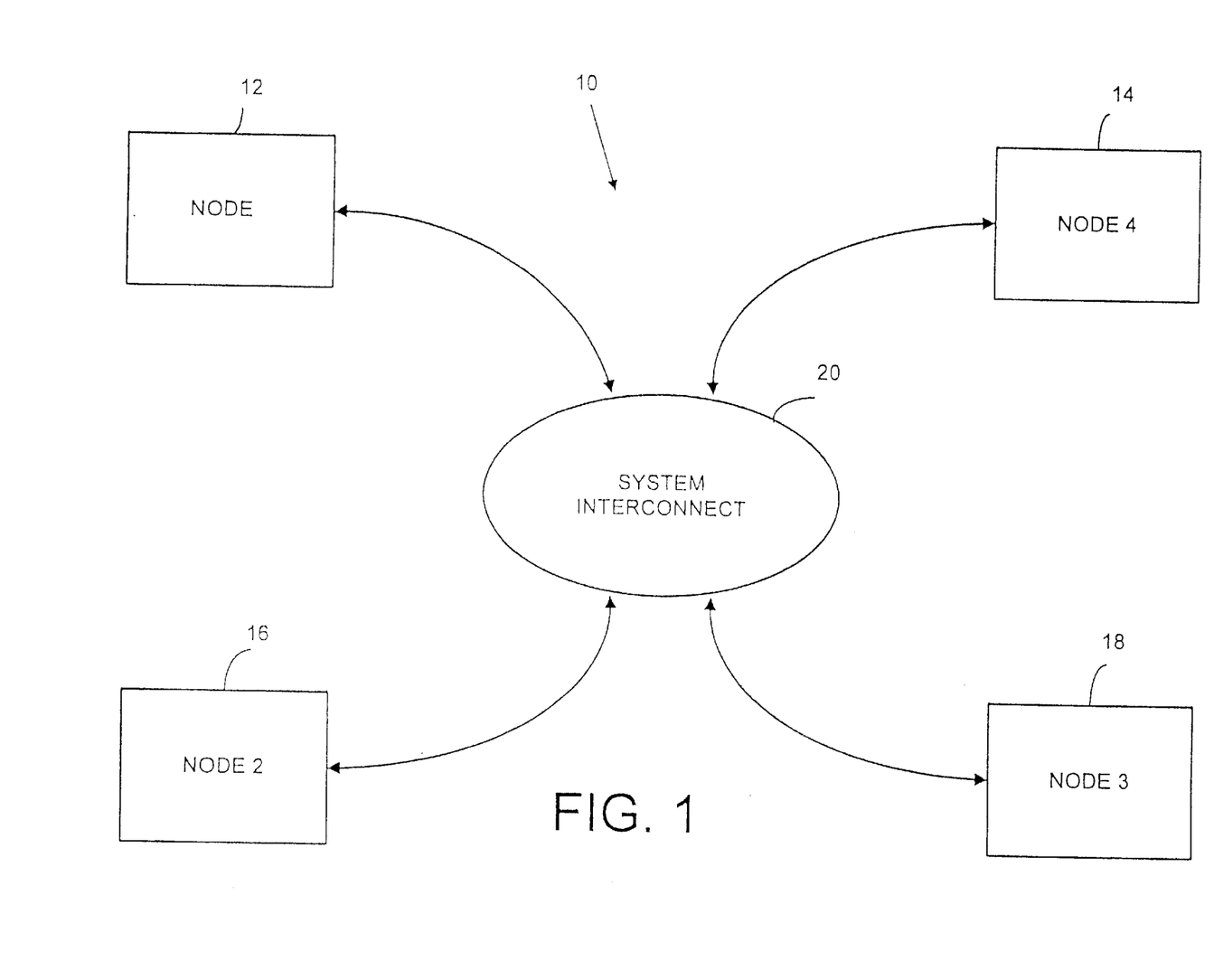
FIG. 1 is a block diagram of a multinode multiprocessor computer system with a system interconnect coupling the nodes together.

FIG. 1 is a block diagram of a multinode, multiprocessor computer system 10 in accordance with the invention. System 10 uses a computer architecture based on Distributed-Shared Memory (DSM) and is a non-uniform memory access (NUMA) machine. Four nodes 12, 14, 16, and 18 are shown connected by a system interconnect 20 (i.e., a network) that permits any node to communicate with any other node. The purpose of system interconnect 20 is to allow processors in any node to access the memory resident in any other node. System interconnect 20 is a switch-based network that uses the Scalable Coherent Interface (SCI) interconnection mechanism. SCI is an IEEE-approved standard, or protocol (1596), well documented in a number of publications including *IEEE Std* 1596–1996 (Aug. 2, 1993) and *Multiprocessor Interconnection Using SCI*, a Master Thesis by Ivan Tving, DTH ID-E 579 (1994), both of which are hereby incorporated by reference.

The physical links of interconnect 20 provide high bandwidth and low latency and are scalable to allow for the addition of more nodes. Links that meet these requirements presently include point-to-point interconnects with a data throughput of one gigabyte/second or greater. The links can be configured in any number of suitable ways for connecting nodes 12, 14, 16, and 18, such as in a ring topology, in arbitrary topologies through switches, or in a combination of both. The links can be wired or wireless (optical, RF, etc.) depending upon system performance needs. Additional topologies are described in "Interconnect Topologies with Point-To-Point Rings," Ross E. Johnson and James E. Goodman, December 1991, *Computer Sciences Technical Report* #1058, University of Wisconsin—Madison, which is hereby incorporated by reference.

Node Overview

Figure 2:
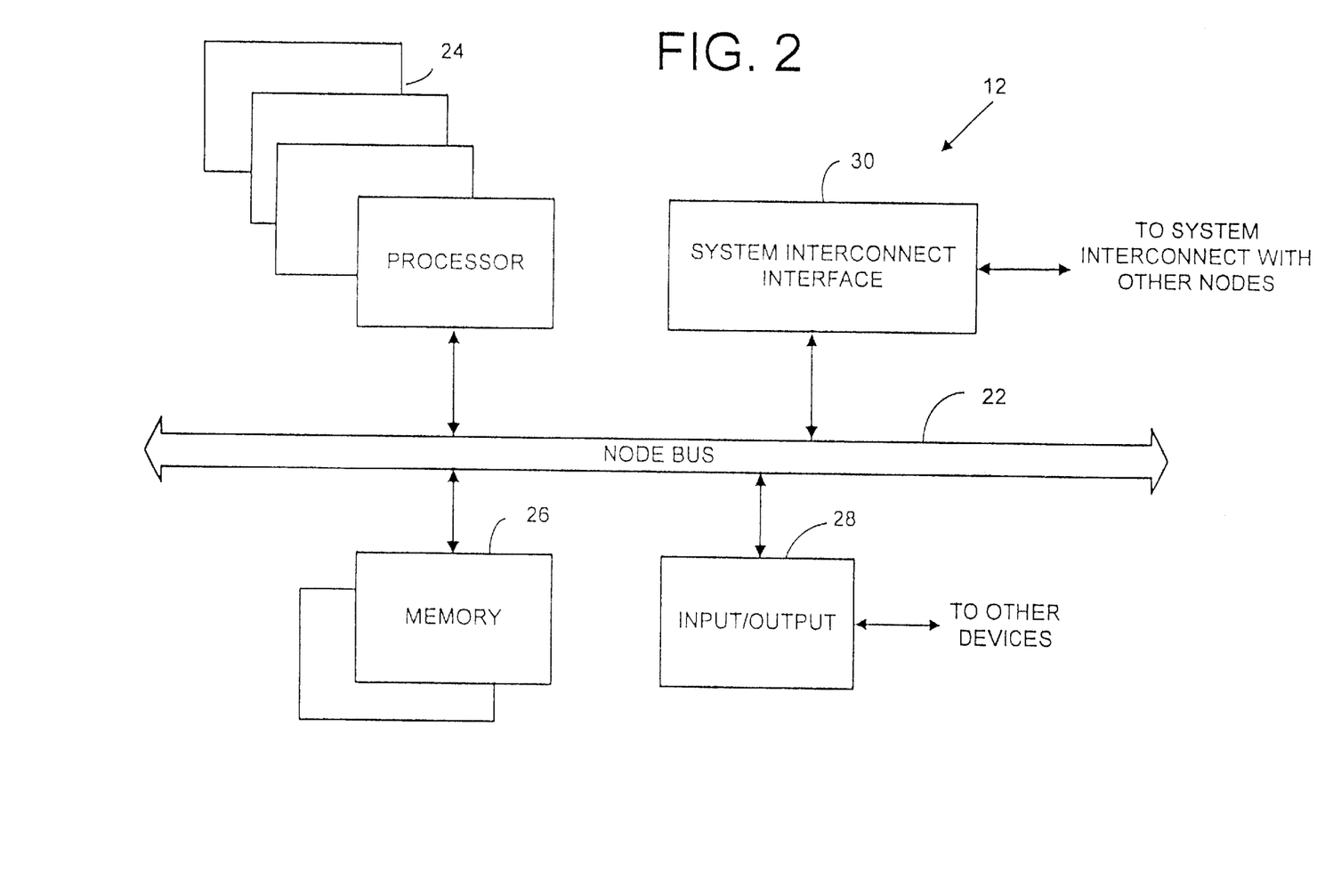
FIG. 2 is a block diagram of one of the nodes of the computer system of FIG. 1.

A block diagram of node 12 on system 10 is shown in FIG. 2. The node includes a conventional symmetrical multiprocessor (SMP) node bus 22 for connecting multiple data processors 24 to local memory 26. For clarity, nodes 12, 14, 16, and 18 may be referred to as home nodes or remote nodes in certain circumstances. A home node is one whose local memory stores a memory block of interest (i.e., the physical address of the memory block falls within the address range supported by the local memory cache); all of the other nodes are then remote nodes with respect to that memory block. Additionally, anode may be a requesting node or a responding node. A requesting node is one requesting data; a responding node is one furnishing such data. Input/output (I/O) 28, which is also connected to bus 22, connects the node to devices outside computer system 10 for communicating information between the computer system and the outside world. I/O 28 may be of conventional design and includes means for connecting the node (and hence system 10) to personal computers, local area networks, etc., that wish to utilize the power of the multinode computer system. The I/O 28 may also allow for connection to peripheral devices, such as floppy disks, hard disks, CD-ROMs etc. To connect node 12 to the other nodes in the system, the node includes a system interconnect interface 30. The system interconnect interface forms part of interconnect 20 along with the physical links between nodes and the same devices on the other nodes of the computer system 10. In the present embodiment, interface 30 is constructed to implement the SCIU standard for data communication between the nodes, allowing a processor on one node to transparently access memory physically located on another node. The interface 30 also contains a remote cache in the present embodiment, although this combination is not required for the invention. The remote cache could also be separate from the system interconnect interface.

Operating System Overview

Figure 3:
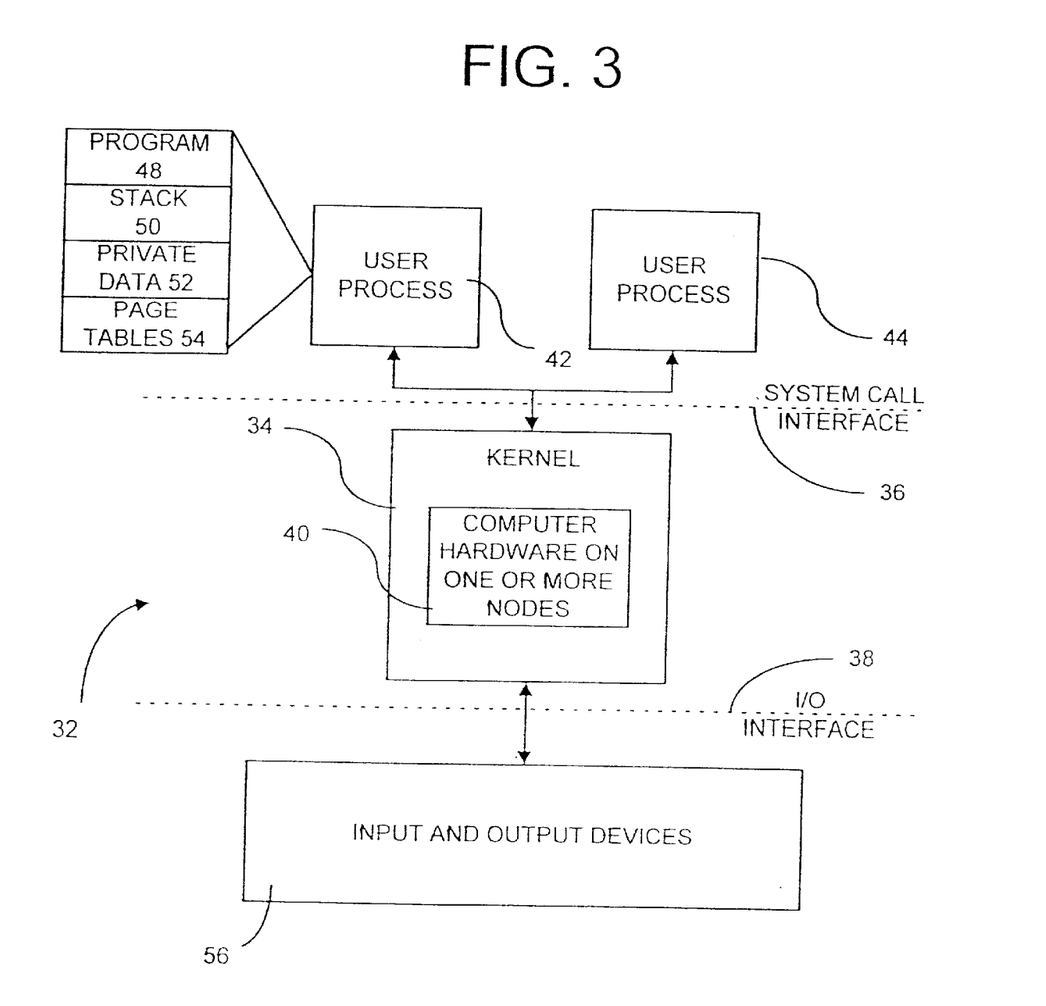
FIG. 3 is a block diagram of the relationship among processes, an operating system and the hardware of the computer system of FIG. 1.

FIG. 3 shows an operating system 32 for computer system 10, which includes a kernel 34, a system call interface 36 and an I/O interface 38. The same operating system environment exists on the other nodes. The illustrated operating system is a UNIX-based operating system, such as DYNIX/ptx, BSD, SVR4, UnixWare, PC UNIX, etc. Other UNIX-based operating systems or other operating systems generally may also be used. For general information on UNIX-based operating systems, see Bach, M. J., *The Design of the UNIX Operating System*, Prentice-Hall, 1986; Vahalia, U., *Unix Internals: The New Frontier*, Prentice-Hall, 1996; McKusick, M., et al., *The Design and Implementation of the 4.4 BSD Operating System*, Addison-Wesley, 1996, which are all hereby incorporated by reference. Kernel 34 (which is the heart of operating system 32) is a program stored in memory 26 on one or more nodes. Memory 26, processors 24, and other hardware shown in FIG. 2 are used for running the kernel 34 and are shown generally as computer hardware 40. Kernel 34 is responsible for controlling the computer system's resources and scheduling user requests so that each user request receives its fair share of the system resources. A system resource can be, for example, an I/O device (e.g., disk drive, tape drive, CM ROM, etc.), a shared memory segment, a file, a process, a processor, etc.

User requests are generated by one or more user processes 42 and 44 that run on system 10. User process 42 includes a part of a program 48 (i.e., instructions) and an execution environment for running the program. For example, process 42 includes several components, such as a stack 50, private data 52 for storing local variables, and page tables 54 used to define physical memory associated with the process. The page table for a process may consist of a hierarchy of such tables, and both single and multi-level page tables are represented by page table 54. Process 44 includes a similar environment to that of process 42. Although two user processes are shown, any number of processes may be run at one time on the node. The user processes make requests to kernel 34 through system calls which are passed to the kernel by system call interface 36. Processes execute in parallel to the extent they can be run concurrently on the different processors of system 10.

Kernel 34 accesses I/O devices 56 through I/O interface 38. For example, if user process 42 requests information from a disk drive (not shown) included within I/O devices 56, user process 42 makes a system call to operating system 32. Operating system 32 uses I/O interface 38 to retrieve the information from the disk drive and returns the information to user process 42.

This embodiment of the invention describes two system calls to kernel 34 and its responses that permit a user process to specify a policy for allocating physical memory on a system node for association with the process's virtual address space. These calls are modified forms of the known functions shmget and mmap. The invention, however, is not limited to these functions, and can be used whenever an application program desires to control the physical placement (i.e., the node where he memory is physically located) of memory references made by the application program within the indicated process virtual address space for which the physical placement policy was instantiated by these system calls.

Specifying a Node for Allocating Memory

Figure 4:
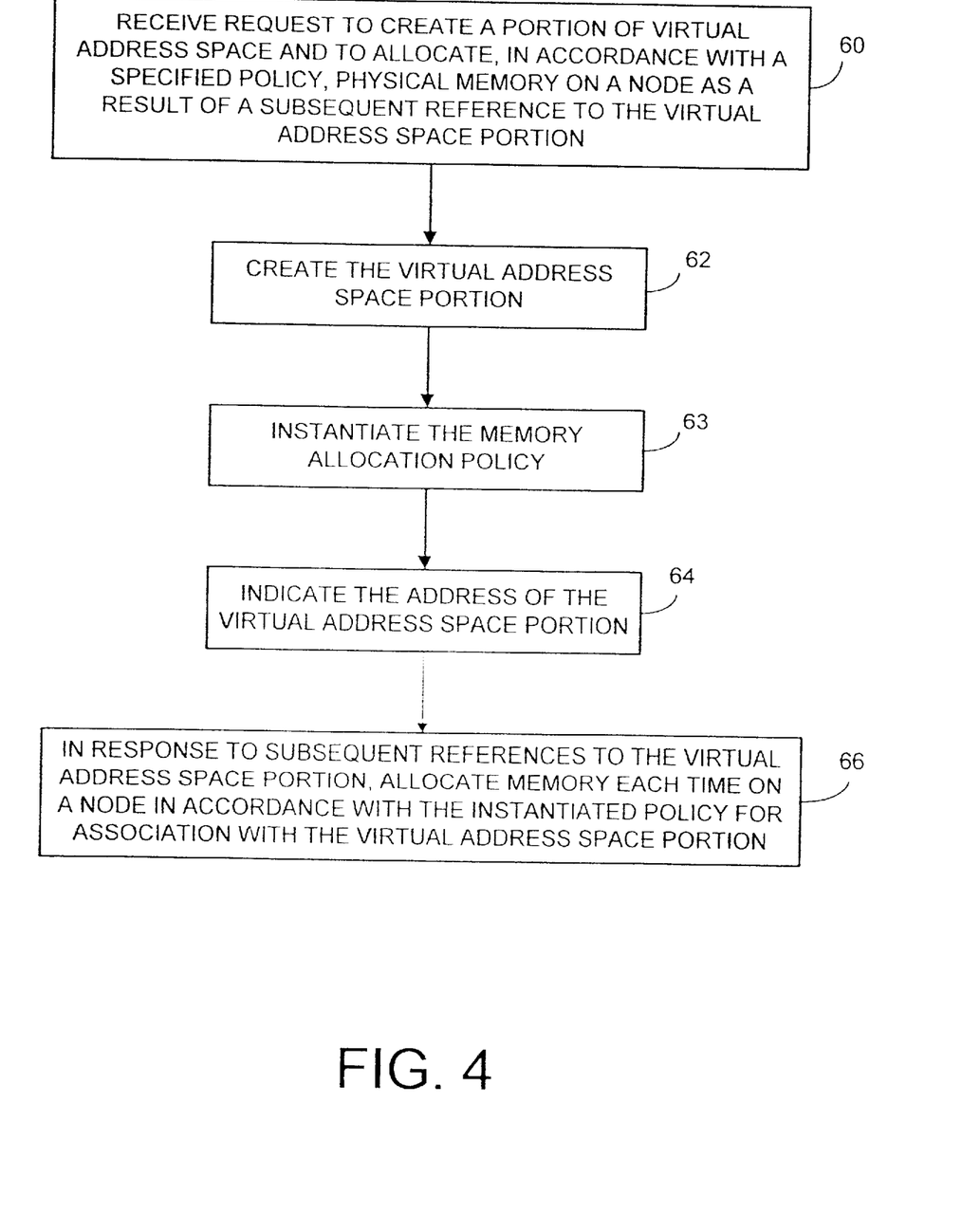
FIG. 4 is a flow chart of a method according to the invention for a process to specify a policy for allocating memory in a multinode multiprocessor computer system.

IG. 4 is a flow chart of a method according to the invention for controlling the physical placement of memory among the nodes of a multinode multiprocessor computer system. This placement occurs in response to processor faults subsequently generated when accessing the application-specified portion of the processor's virtual address space for which the pages are to be allocated. (Application of this method assumes that such pages are not already present in the physical memory of system 10 as a result of memory references made by other processes in the system.) In a first step 60, the operating system receives a request from an application program to establish a new portion of virtual address space for the application program (process) which maps to an underlying mapped object in accordance with a physical memory management or allocation, policy. That is, the request specifies a policy by which physical memory will be allocated in system 10 for the virtual address space portion when the portion is first subsequently referenced by a process. The underlying mapped object may be identified in a number of ways, such as through the mapping of a file (such as an mmap system call) or through the creation of a shared memory segment (such as through a shmget system call). In a second step 62, the virtual address space portion is created (i.e., reserved) and an association is made between the portion and the mapped object so that references to the portion are translated into references to a memory object. In a third step 63, the allocation policy for physical pages subsequently allocated as a result of references to the new portion of virtual address space is instantiated that, upon a first reference to a page of the underlying mapped object within the newly created virtual address space, determines the node upon which that physical page will be allocated. In a fourth step 64, the virtual address of the portion is indicated to the requesting process, confirming that the mapping is successful. In a fifth step 66, performed for each reference made by a process to a page of the underlying mapped object when no other process in the system has that page presently referenced, the allocation placement policy instantiated in step 63 is used to determine the node upon which the physical page should be allocated. This allocation is typically done in response to a fault generated by the process (such as a page fault) when it seeks to access a page of the file that is stored in secondary storage but has not yet been placed in physical memory.

Specifying the Nodes in a File Mapping

Two mechanism are provided in the preferred embodiment to allow a requesting process to specify an allocation policy for physical memory. In the first mechanism, allocation policy flags are added to the known mmap system call to specify where the memory will be ultimately allocated, such as the following:

Void *mmap (void *addr, size_t len, int prot, int flags, int fd, off64_t pos)

The mmap system call and responding operating system function establish a mapping between a process's address space and a virtual memory object, such as a file or an anonymous shared memory region, depending on the value of the flags parameter. For a mapped file region, mmap causes the file referenced by fd, starting at byte pos for len bytes, to be mapped into the calling process's address space starting at the address specified in the addr parameter. For an anonymous region, mmap causes a zero-filled memory region of len bytes to be mapped into the calling process's address space at the specified address addr (pos is not used). The process's access to the region is determined by prot, and whether the region is shared or private is determined by the flags parameter.

The invention extends the conventional mmap function of the kernel 34 by adding to it the ability to control on which node memory will be allocated for a file page in response to a subsequent reference to the virtual address space portion and page fault generated thereby. The function responds to three allocation policy flags in the mmap system call. These flags allow the calling process to specify on which nodes of computer system 10 physical pages of memory can be allocated for the process:

MAP_FIRSTREF Allocate the pages of memory on the node from which the first subsequent reference by a process is made.

MAP_MOSTFREE Allocate the pages of memory on the node with the most free memory at the time the subsequent reference is made.

MAP_DISTRIBUTE Allocate the pages of memory successively on the next node of a list of nodes at the time of subsequent reference is made.

Only one of MAP_FIRSTREF, MAP_MOSTFREE and MAP_DISTRIBUTE can be specified at one time.

In the second mechanism, an additional system call parameter (referred to as qds in the preferred embodiment)

has been provided to enable the calling process to specify a set of nodes within system 10 from which the physical memory must be allocated in accordance with the allocation flags. This set of nodes can be a few as zero or one or as many as all of the nodes within the computer system. In the preferred embodiment this further extension of mmap is labeled mmapq. The mmapq system call (and responding kernel function) is identical to mmap (and its kernel function) except for the inclusion of the qds parameter that limits the mapping to the specified set of nodes. The call takes the following form:

Void *mmapq (void *addr, size_t len, int prot, int flags, int fd, off64_t pos, quadset *qds)

where the parameter qds restricts the subsequent memory allocation to a specified set of nodes. This parameter may be encoded in a number of ways, such as through a pattern of bits.

Figure 5:
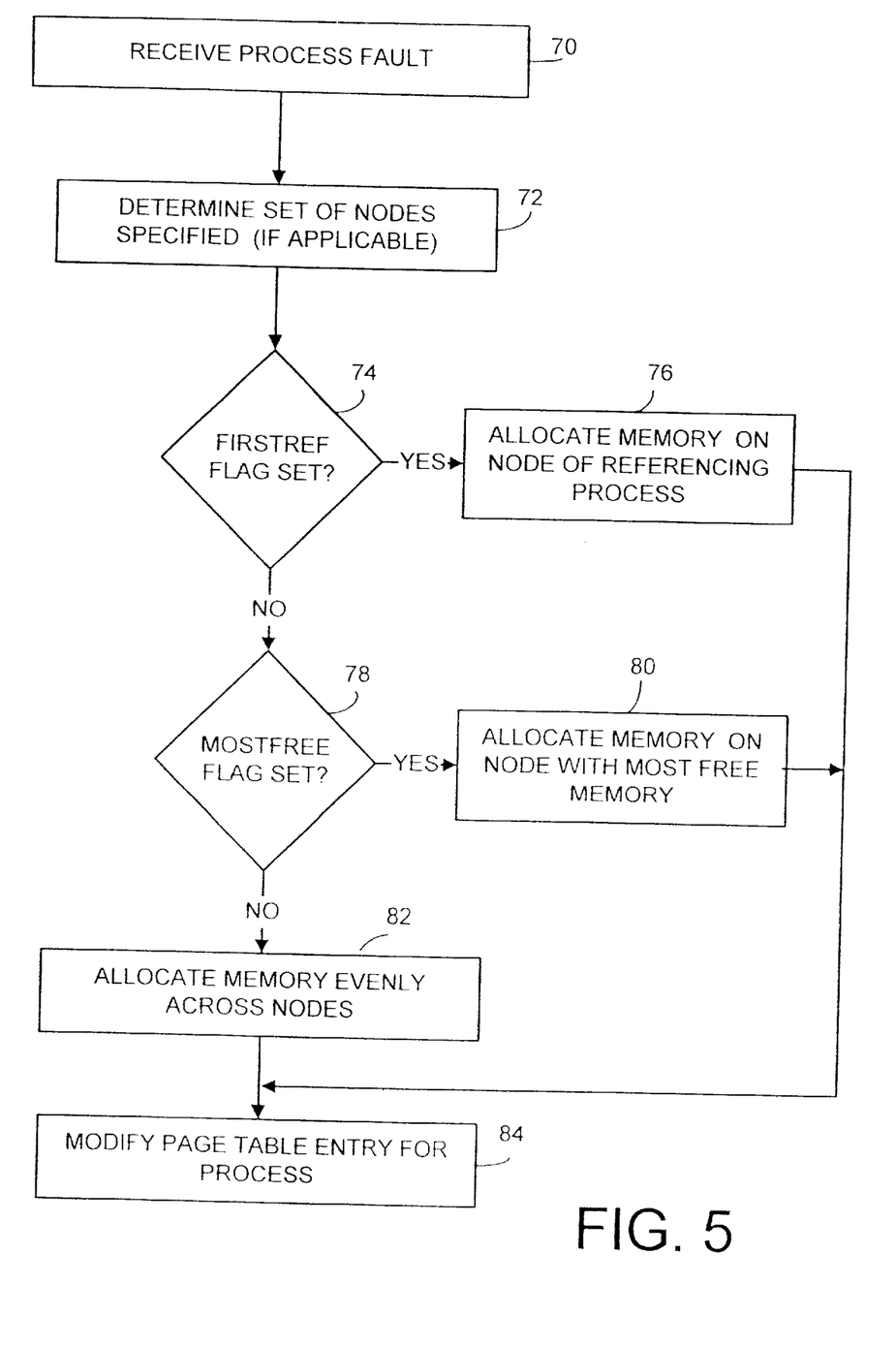
FIG. 5 is a flow chart showing in more detail a preferred method for carrying out the allocating step of FIG. 4.

FIG. 5 is a flow chart showing in more detail a preferred method for carrying out the allocating step 66 of FIG. 4, where the mmapq system call or equivalent and responding kernel function are used to specify the memory allocation policy. The steps of FIG. 5 show the response of the operating system 32 to a fault generated by a process when it references the virtual address space portion, such as by seeking to access a page of a file that has been mapped but is not yet resident in physical memory. In a first step 70, the operating system detects the page fault. It responds by determining the set of nodes specified by the parameter qds in the system call earlier received for use with the allocation policy (step 72). (If the mmap system call or equivalent is used, this step does not occur and all the nodes of system 10 by default are available.) The operating system then checks the policy flags FIRSTREF and MOSTFREE to see if either is set (steps 74, 78). A user process may set FIRSTREF if it is desired that the file page(s) be mapped on the same node that the process referencing the virtual address space is located, taking advantage of locality of reference. If FIRSTREF is set (and assuming that the file page is not already resident in physical memory), the operating system allocates physical pages from the free list of the referencing process's node (step 76). A user may set MOSTFREE if it is desired that the physical pages be allocated on the node with the most free memory at the time the reference is made, which typically means that the referenced pages have a greater chance of remaining in the memory of system 10 for a longer duration before being paged-out. If MOSTFREE is set, the operating system checks the free list for each of the nodes in qds and selects the node with the most number of free pages (step 80). If neither of these flags is set, then by default the DISTRIBUTE flag is set and the needed physical pages of memory are allocated evenly across the nodes (step 82). This even allocation may be done by keeping a circular list of the nodes and allocating memory from a next node of the list, returning to the top of the list once the bottom is reached.

Whatever flags are set, the operating system responds to the page fault by modifying the appropriate page table entries for the process to reflect the physical address of the memory corresponding to the virtual page (step 84).

Figure 6:
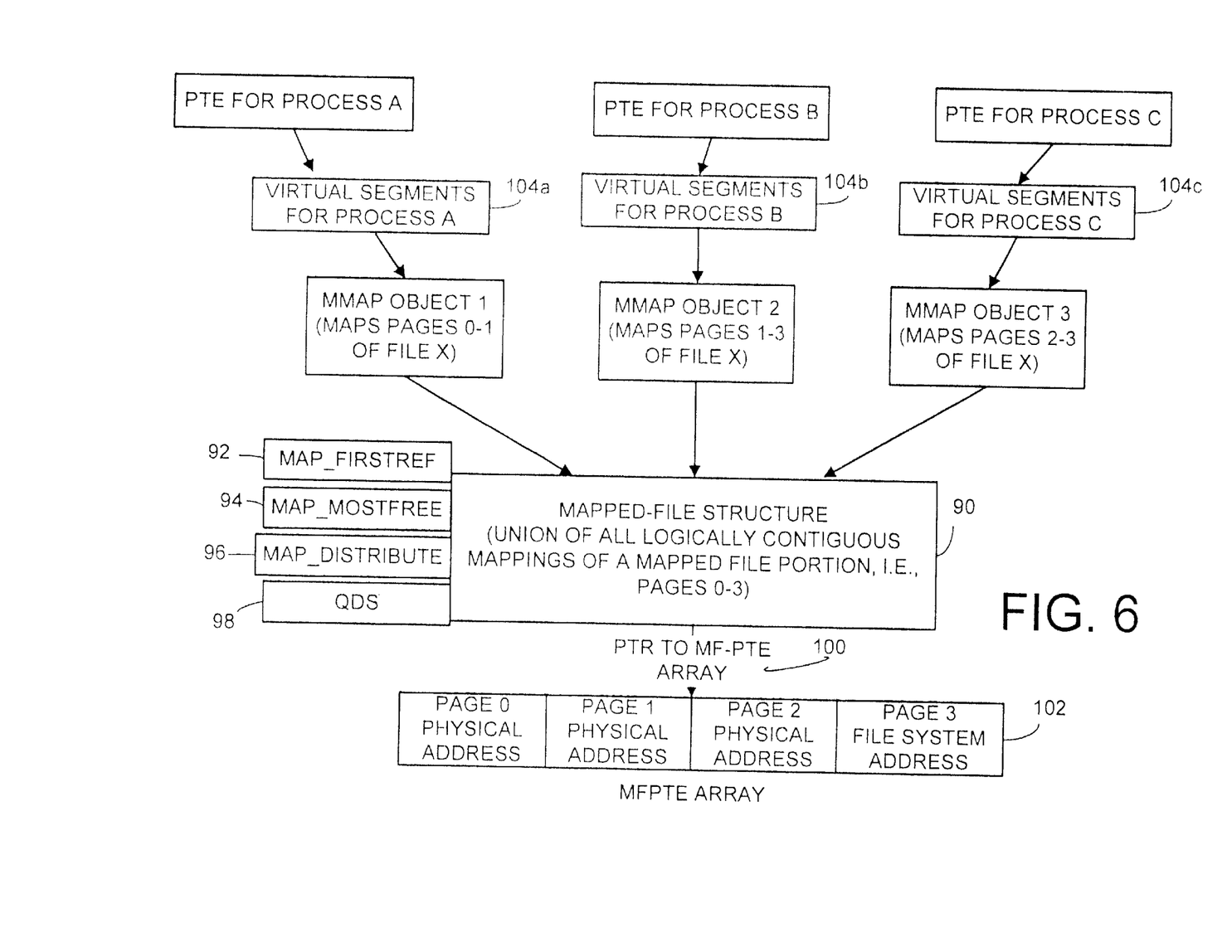
FIG. 6 is a block diagram of data structures created in accordance with the invention for carrying out the method of FIG. 4.

FIG. 6 is a block diagram that illustrates with data structures how the kernel 34 in the preferred embodiment responds to either and mmap or an mmapq system call or equivalent request to allocate memory on a specified node. When a process generates either an mmap or an mmapq system call, the kernel creates a kernel data structure known as an mmap object that describes the pages of the file that the process desires to map. For example, process A is mapping pages 0 and 1 of file X, process B is mapping pages 1 through 3 of file X, and process C is mapping pages 2 through 3 of file X. The kernel in response creates mmap object 1, 2, and 3. The mmap objects point to another data structure that the kernel creates, a mapped-file structure 90. This structure defines a union of all logically contiguous mappings of a mapped file portion, i.e., pages 0 through 3 in this example. This structure also includes elements 92, 94, 96 and 98 for the allocation policy flags MAP_DISTRIBUTE, MAP_MOSTFREE, AND MAP_FIRSTREF, and (if mmapq is the system call) the parameter QDS. Structure 90 further includes a pointer 100 to another data structure such as MFPTE array 102 that contains the address for each of the mapped file pages of the union, whether in physical memory or secondary storage (e.g., the file system).

Mapped-file structure 90 and array 102 are initially established upon creation of mmap objects 1, 2, and 3. Before a page fault occurs, each of the elements of array 102 includes the file system address for the corresponding mapped file page since no process has yet faulted in seeking access to a page.

When a page fault occurs, the faulting process determines from the page table entry that the missing page is mapped, and examines data structure 90 to find the file system address for the page. For example, process A looks from its page table entry to a virtual segment 104a for the process to mmap object 1. From there process A finds structure 90, pointer 100 and array 102. The process then checks the element of the array corresponding to the missing page. If the element contains a physical address in memory, then allocation policy flags and parameter qds 92, 94, 96, and 98 are ignored because the page is already in memory an there is no need to place it again in physical memory. However, if the page is only available in the file system, then the allocation policy flags and parameter qds (if the system call is mmapq) are checked to determine where a physical page of memory should be allocated for the missing file page. Memory is allocated as determined by the flags and parameter and the physical address is stored in the corresponding element of array 102. The file system address is stored elsewhere for reinserting into the array element if the page corresponding to the physical address is ever paged out of physical memory.

Specifying the Nodes in Shared Memory

A process may also specify a physical memory placement (allocation) policy through a system call such as shmget to operating system 32 to associate a shared memory segment with physical memory on a particular node. This system call allows a process to create a shared memory region using a kernel function and takes the following form:

int shmget (key_t key, int size, int shmflg).

Like mmap, the system call shmget has two mechanisms for allowing a requesting process to specify an allocation policy for physical memory. In the first mechanism, three allocation policy flags allow the calling process to restrict the set of nodes within system 10 upon which the shared pages for the given segment can be allocated:

SHM_FIRSTREF Allocate the pages of memory on the node from which the first subsequent reference by a process is made.

SHM_MOSTFREE Allocate the pages of memory on the node with the most free memory at the time the subsequent reference is made.

SHM_DISTRIBUTE Allocate the pages of memory on the next node of a list of nodes at the time the subsequent reference is made.

As in mmap, only one of these three policy flags can be specified at one time.

The shmget function of the operating system 32 operates in similar manner to the mmap function described above with respect to allocating memory on a specified node. And similar to mmapq, a second mechanism is provided in a shmgetq system call (and responding kernel function) to enable the calling process to specify a set of nodes within system 10 to which the allocation flags apply and from which memory must be allocated:

int shmgetq (key_t key, int size, int shmflg, quadset *qds) where the parameter qds specifies a group of nodes from which the physical memory must be allocated.

Data structures equivalent to those in FIG. 6 are used by kernel 34 with shmget and shmgetq to allocate the memory in the manner specified by these flags and parameter.

Having illustrated and described principles of the invention in a preferred embodiment, it should be apparent to those skilled in the art that the preferred embodiment can be modified in arrangement and detail without departing from such principles. For example, in an alternative embodiment, the memory allocation can be done immediately at the time of the request rather than later. Other allocation policies than the three examples may be implemented, such as most recent, least used, etc. The steps of the inventive method may be used in other system calls or apportioned into additional system calls, as desired. The steps may be carried out by computer programs other than through the operating system executing in a computer. The invention may be used with other multiprocessor computer systems, with memory interconnect interfaces other than SCI, and with memory management techniques other than pages. In view of the many possible embodiments to which the principles of our invention may be applied, it should be recognized that the illustrated embodiment is only a preferred example of the invention and should not be taken as a limitation on the scope of the invention. Rather, the scope of the invention is defined only by the following claims. We therefore claim as our invention all that comes within the scope and spirit of these claims.

We claim:

1. In a multiprocessor computer having an operating system and having shared memory distributed among multiple nodes, a method of dynamically allocating physical memory on a node, the method comprising the following steps:

receiving a request to the operating system from an application program to create a portion of virtual address space and to allocate, in accordance with a specified one of a plurality of policies specifiable by the application program, physical memory on at least one node as a result of a subsequent reference to the virtual address space portion;

in response to the request, creating the virtual address space portion; and in response to a subsequent reference to the virtual address space portion, allocating physical memory on a node in accordance with the specified policy for association with the virtual address space portion.

2. The method of claim 1 wherein the policy specified by the application program is to allocate the physical memory on the node from which the first subsequent reference is made.

3. The method of claim 1 wherein the policy specified by the application program is to allocate the physical memory on the node with the most free physical memory at the time the subsequent reference is made.

4. The method of claim 1 wherein the receiving step includes identifying in the request a set of nodes specified by the application program from which the physical memory must be allocated.

5. The method of claim 1 wherein:

the receiving step comprises receiving a system call that includes flags specifying the policy.

6. The method of claim 1 wherein the subsequent reference includes a process fault.

7. A computer readable medium having stored therein instructions for performing the steps of claim 1.

8. A multiprocessor computer system comprising:

multiple nodes;

shard memory distributed on the nodes; and a data structure stored in memory that controls the allocation, in response to a subsequent reference to a virtual address space portion of an application program, of physical memory on at least one node in accordance with a specified one of a plurality of policies specifiable by the application program for association with the virtual address space portion.

9. The computer system of claim 8 wherein the data structure includes a field whose data specifies the policy of the application program.

10. The computer system of claim 9 wherein the data of the data structure field specifies a policy of allocating the physical memory on the node from which the first subsequent reference is made.

11. The computer system of claim 8 wherein the data structure includes a field whose data indicates a set of nodes specified by the application program from which the physical memory must be allocated.

12. The multiprocessor computer system of claim 8, wherein the plurality of policies comprises at least one non-size-based policy.

13. In a multiprocessor computer having shared memory distributed among multiple nodes, a method of allocating physical memory to a process, the method comprising:

creating a portion of virtual address space for the process; and allocating, in accordance with a specified one of a plurality of policies specifiable by the process, physical memory on a node for association with the virtual address space portion.

14. The method of claim 13 wherein the allocating occurs in response to a subsequent reference to the virtual address space portion by the process.

15. The method of claim 13 including specifying in the process a set of nodes within the multiprocessor computer from which the physical memory must be allocated.

16. A computer readable medium having stored therein instructions for performing the steps of claim 13.

17. The multiprocessor computer of claim 13, wherein the plurality of policies comprises at least one non-size-based policy.

18. In a multiprocessor computer having shared memory distributed among multiple nodes, a data structure stored in a computer readable medium for allocating physical memory to a process, the data structure allocating, in accordance with a specified one of a plurality of policies specifiable by the process, physical memory on a node for association with the virtual address space portion.

19. The data structure of claim 18 wherein the allocating occurs in response to a subsequent reference to a virtual address space portion by the process.

20. The multiprocessor computer of claim 18, wherein the plurality of policies comprises at least one non-size-based policy.

* * * * *